United States Patent
De Brouwer et al.

(10) Patent No.: US 10,269,274 B2
(45) Date of Patent: Apr. 23, 2019

(54) ILLUMINATION DEVICE FOR ILLUMINATING THE VERTICAL TAIL PLANE OF AN AIRCRAFT AND AIRCRAFT WITH EXTERIOR ILLUMINATION ON ITS VERTICAL TAIL PLANE

(71) Applicant: Airbus Operations S.L., Getafe (ES)

(72) Inventors: Gabrielle Joséphine Christiane De Brouwer, Getafe (ES); Sergio González Fernández, Getafe (ES); Jesús Robledo Bueno, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 0 days.

(21) Appl. No.: 15/849,382

(22) Filed: Dec. 20, 2017

(65) Prior Publication Data

US 2018/0204490 A1     Jul. 19, 2018

(30) Foreign Application Priority Data

Dec. 28, 2016  (EP) ..................................... 16382665

(51) Int. Cl.
*F21V 1/20* (2006.01)
*G09F 21/10* (2006.01)
(Continued)

(52) U.S. Cl.
CPC .............. *G09F 21/10* (2013.01); *B64D 47/02* (2013.01); *B64D 47/06* (2013.01); *F21S 45/47* (2018.01);
(Continued)

(58) Field of Classification Search
CPC ......... G09F 21/10; B64D 47/02; B64D 47/06; B64D 2203/00; F21V 23/003;
(Continued)

(56) References Cited

U.S. PATENT DOCUMENTS

| 2009/0195753 A1* | 8/2009 | Dill ........................ G03B 21/00 353/28 |
| 2012/0195056 A1* | 8/2012 | Edmond ................ B64D 47/06 362/470 |

(Continued)

FOREIGN PATENT DOCUMENTS

| EP | 2085954 | 8/2009 |
| EP | 2549329 | 1/2013 |
| EP | 3106392 | 12/2016 |

OTHER PUBLICATIONS

European Search Report, dated Jun. 13, 2017, priority document.

*Primary Examiner* — Ali Alavi
(74) *Attorney, Agent, or Firm* — Greer, Burns & Crain, Ltd.

(57) ABSTRACT

A device for illuminating a vertical tail plane of an aircraft, comprising a matrix of LEDs or lasers, a laser diode with a diffractive optical element, an electronic board with a microcontroller, a power supply unit and a housing enclosing one or more of the matrix of LEDs, the laser diode, the electronic board and the power supply unit. The LEDs or lasers and the laser diode are individually and electronically controlled by the microcontroller, in such a way that the LEDs or lasers can be individually dimmed to create a dynamic illumination pattern on the side surfaces of the vertical tail plane. The illumination pattern is transmitted by the microcontroller. The laser diode with the diffractive optical element can create a fixed figure on the side surfaces of the vertical tail plane. An aircraft is provided with exterior illumination on its vertical tail plane, comprising such illumination devices.

15 Claims, 4 Drawing Sheets

(51) Int. Cl.
| | |
|---|---|
| B64D 47/02 | (2006.01) |
| F21V 23/00 | (2015.01) |
| F21V 5/00 | (2018.01) |
| F21S 45/47 | (2018.01) |
| F21V 23/02 | (2006.01) |
| F21V 14/02 | (2006.01) |
| B64D 47/06 | (2006.01) |
| H05B 33/08 | (2006.01) |
| B64C 5/02 | (2006.01) |
| F21Y 115/30 | (2016.01) |
| F21Y 115/10 | (2016.01) |
| F21Y 113/13 | (2016.01) |
| F21S 43/13 | (2018.01) |
| F21S 43/14 | (2018.01) |

(52) U.S. Cl.
CPC .............. *F21V 5/007* (2013.01); *F21V 14/02* (2013.01); *F21V 23/003* (2013.01); *F21V 23/023* (2013.01); *B64C 5/02* (2013.01); *B64D 2203/00* (2013.01); *F21S 43/13* (2018.01); *F21S 43/14* (2018.01); *F21Y 2113/13* (2016.08); *F21Y 2115/10* (2016.08); *F21Y 2115/30* (2016.08); *H05B 33/0845* (2013.01)

(58) Field of Classification Search
CPC ....... F21V 5/007; F21S 43/13; F21Y 2115/30; F21Y 2115/10; F21Y 2113/13
See application file for complete search history.

(56) References Cited

U.S. PATENT DOCUMENTS

2012/0327378 A1* 12/2012 Harvey ................ G03B 21/145
                                                                353/52
2016/0368621 A1* 12/2016 Lueder .................... B64C 5/02

* cited by examiner

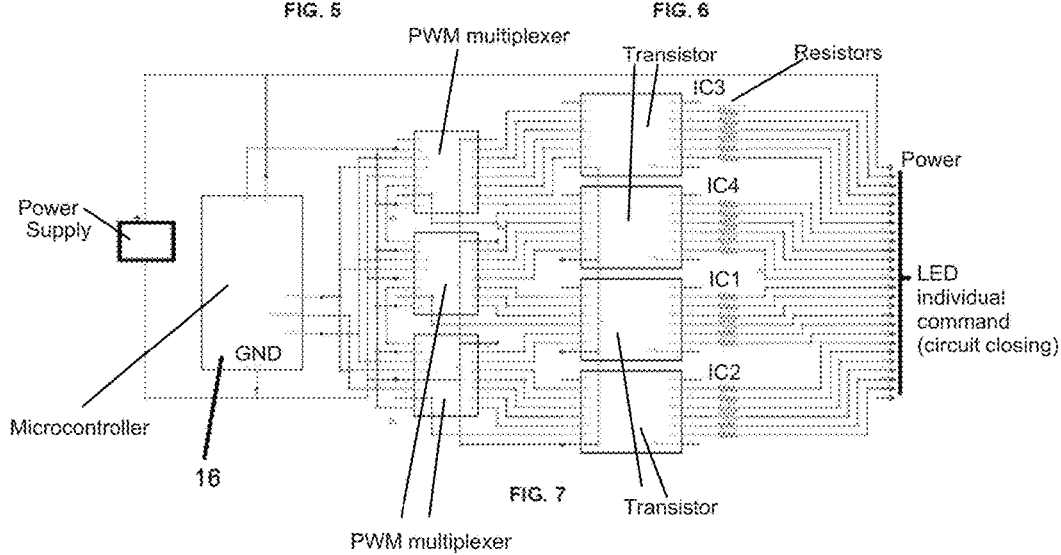

ILLUMINATION DEVICE FOR ILLUMINATING THE VERTICAL TAIL PLANE OF AN AIRCRAFT AND AIRCRAFT WITH EXTERIOR ILLUMINATION ON ITS VERTICAL TAIL PLANE

CROSS-REFERENCES TO RELATED APPLICATIONS

This application claims the benefit of the European patent application No. 16382665.4 filed on Dec. 28, 2016, the entire disclosures of which are incorporated herein by way of reference.

FIELD OF THE INVENTION

The present invention relates to an illumination device for illuminating the vertical plane of an aircraft and to an aircraft with exterior illumination on its vertical tail plane (VTP).

An object of the invention is related to the exterior lights system of the aircraft, which is part of the electrical supply system of the aircraft.

BACKGROUND OF THE INVENTION

Most airline companies have their name or logo painted on both side surfaces of the vertical tail planes of their aircraft, in order to increase their visibility.

Currently the VTP is illuminated by a "logo light," which is a static light installed on the horizontal tail planes (HTP) which points to the middle of the VTP. The logo light is of a color between white and yellow, usually has one or two light sources if it is of a halogen type, and does not illuminate the complete logo of many airline companies when the logo is painted on the VTP.

Other aircraft lighting devices are intended to be installed on the wings or on the wingtips to provide illumination on these elements and improve visibility for passengers and passers-by. For instance, US 2012195056 A1 discloses an aircraft wingtip device comprising illumination means arranged to project light onto interior and exterior surfaces of the wingtip device. The aircraft wing tip device assembly of US 2012195056 A1 comprises a wing tip device defining a first end for attachment to a part of an aircraft wing, a second free end, and a lighting device arranged to project light onto a face of the wing tip device from a location proximate the second end.

Although the "logo lights" on the HTP currently used provide illumination to the VTP, they present limitations derived from the above-mentioned drawbacks.

SUMMARY OF THE INVENTION

Therefore, an object of the invention is to provide an illumination device for illuminating the vertical tail plane of an aircraft which provides an improved highlight of the name or logo printed on the vertical plane tail, and an aircraft with exterior illumination on its vertical tail plane comprising such illumination devices.

The invention provides an illumination device for illuminating the vertical tail plane of an aircraft, comprising:
a matrix of LEDs or lasers,
a laser diode with a diffractive optical element,
an electronic board with a microcontroller,
a power supply unit, and
a housing that encloses one or all of the matrix of LEDs, the laser diode, the electronic board and the power supply unit,
wherein the LEDs or lasers and the laser diode are individually and electronically controlled by the microcontroller, in such a way that the LEDs or lasers can be individually dimmed to create a dynamic illumination pattern on the side surfaces of the vertical tail plane, the illumination pattern being transmitted by the microcontroller, and the laser diode with the diffractive optical element can create a fixed figure on the side surfaces of the vertical tail plane.

This illuminated form, text or image can be defined depending on the client need and in esthetic coherency with the logo of the Airline.

The configuration of the illumination device for illuminating the vertical tail plane of an aircraft of the invention solves the above-mentioned problem.

In effect, with this configuration, the name or the logo of the airline company printed on the vertical plane tail is highlighted with the dynamic illumination pattern, thus increasing its visibility with respect to the aircraft of the other airline companies.

The invention also provides an aircraft with exterior illumination on its vertical tail plane.

Another advantage of the invention is that it is possible to obtain customization for each airline company, adjusting the illumination patterns and colors to its needs, as LEDs can be white or color ones (RGB), as well as the laser diode. The diffractive optical element of the laser also allows customization throughout the life of the product as it can be changed independently of the rest of the light. Thus, the figure, form or text displayed, due to the laser diode and the diffractive optical element, can be changed according to commercial needs.

Another advantage of the invention is that it can be added to the current logo light previously mentioned, as an optional add-on.

Another advantage of the invention is that it can use LED technology, which provides an increased reliability.

BRIEF DESCRIPTION OF THE DRAWINGS

For a more complete understanding of the present invention, it will be described below in greater detail, making reference to the attached drawings, in which:

FIGS. 5 and 6 show arrangements for the matrix of LEDs of the illumination device of the invention.

FIG. 7 is a proposed architecture for the electronic control.

DETAILED DESCRIPTION OF THE PREFERRED EMBODIMENTS

Figure 1:
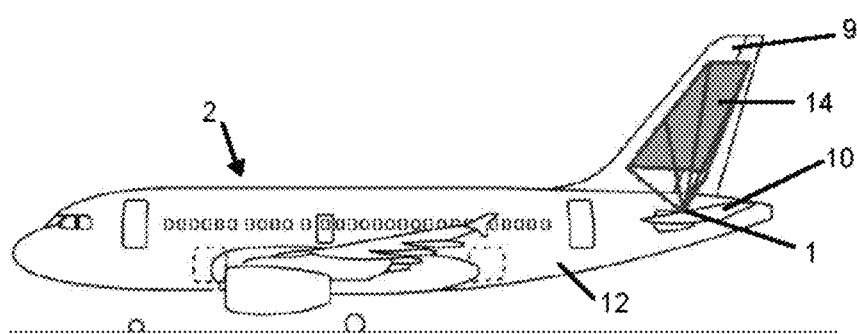
FIG. 1 is a side view of a conventional aircraft, showing a horizontal tail plane and the vertical tail plane, and an illumination device projecting an illumination pattern on one side surface of the vertical tail plane.

FIG. 1 shows a side view of a conventional aircraft 2 comprising, among other elements, an aircraft fuselage 12 from which a vertical tail plane 9 and two horizontal tail planes 10 project.

The vertical tail plane 9 has a text or logo painted on it.

Figure 3:
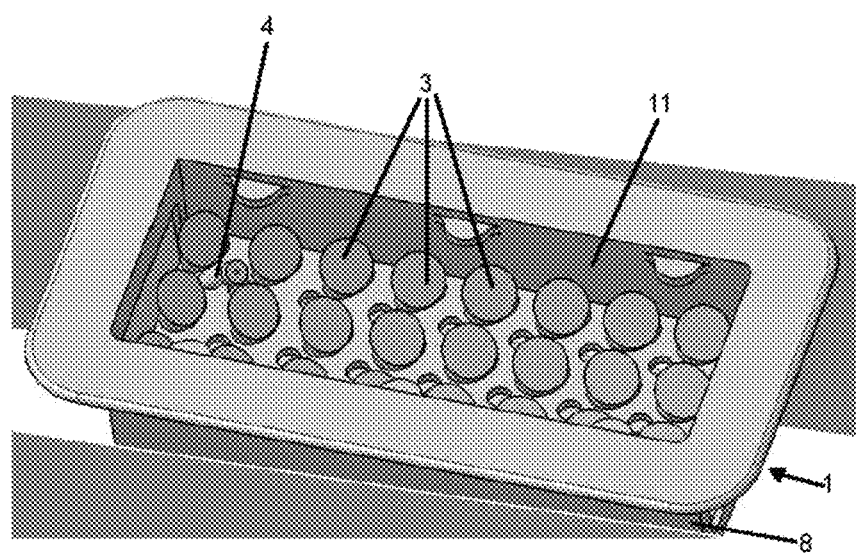
FIG. 3 is a representation of an illumination device of the invention including the laser diode.
Figure 4:
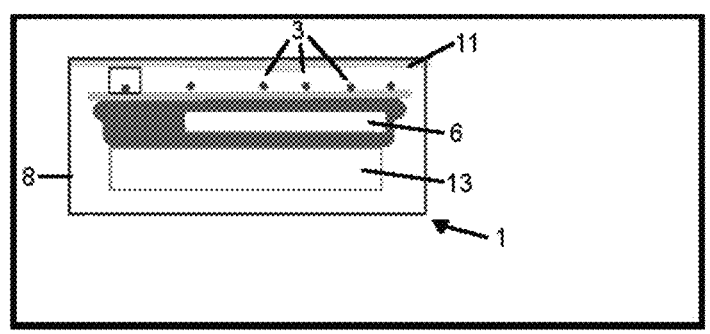
FIG. 4 is a schematic representation of the illumination device of FIG. 3.

Each horizontal tail plane 10 comprises the illumination device 1 shown in FIGS. 3 and 4, connected to the electrical supply system of the aircraft 2 and oriented to provide light onto the respective closest side surface of the vertical tail plane 9. According to one embodiment, the orientation of the illumination devices 1 with respect to the vertical tail plane 9 is adjustable.

Figure 2:
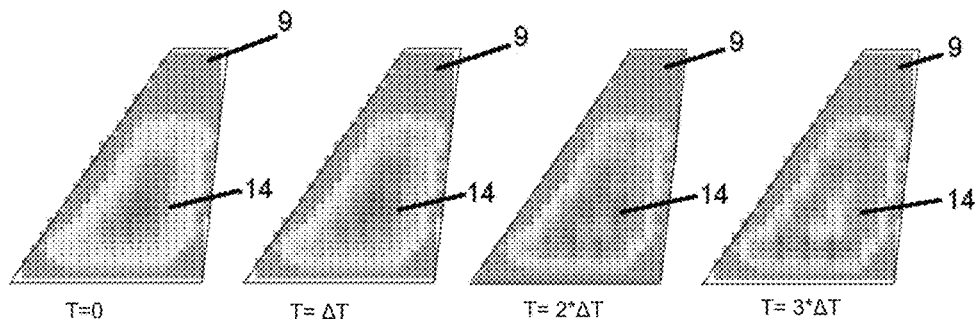
FIG. 2 is a sketch of illumination pattern examples on one side surface of the vertical tail plane.

FIG. 2 is simplified model of one side surface of a vertical tail plane 9, on which the different steps of an illuminated pattern provided by the LEDs 3 is shown as an example: on this FIG. 2 views of illumination for successive steps of time appear, showing the intensity of luminous flux.

The illumination device 1 shown in FIGS. 3 and 4 comprises:
  a matrix of LEDs 3 each with its individual optical cluster,
  a laser diode 4 with its diffractive optical element 5,
  an electronic board 6 with a microcontroller 16,
  a power supply unit, and
  a housing 8 that encloses fully or partially the above-mentioned elements,
  such that the LEDs 3 and the laser diode 4 are individually and electronically controlled by the microcontroller 16, in such a way that the LEDs 3 can be individually dimmed to create a dynamic illumination pattern 14 on the side surfaces of the vertical tail plane 9, the illumination pattern 14 being transmitted by the microcontroller 16. The laser diode 4 combined with a diffractive optical element 5 allows the projection of a fixed figure on the vertical tail plane 9, that is superimposed on the logo. This illuminated form, text or image can be defined depending on the client need and in esthetic coherency with the logo of the Airline. The diffractive optical element 5 can be customizable and interchangeable throughout the life of the product.

The LEDs 3 can be of different colors to create color illumination patterns 14.

The laser diode 4 can be monochromatic and controlled by the power supply unit.

The housing 8 can enclose the matrix of LEDs 3, the laser diode 4 and the electronic board 6 and may comprise an upper cover 11 made of plastic or glass (see FIG. 4). The electronic board 6 can also be in a separated part, along with the power supply unit, according to the installation constraints of the light.

The power supply is not represented in the figures, and can be managed separately or in an integrated manner in the illuminating device 1, depending on installation constraints on the aircraft 2. The impact of the choice of integrated or separated power supply unit is on the dimensioning of the heat dissipation sinks 13.

Each LED 3 may have an associated lens and/or mirror, as optical elements. FIG. 3 shows a proposal with mirrors in the matrix of LEDs 3.

Each illumination device 1 additionally may comprise a heat sink 13 under the electronic board 6 to dissipate the heat in the illumination device 1 (see FIG. 4).

The matrix of LEDs 3 can have many configurations, depending on the surface to be illuminated and on installation constraints. As non-limiting examples, matrixes of x*y LEDs 3 can be used. For instance, the matrix of LEDs 3 can be formed by 24 LEDs 3; it may be an arrangement formed by 4 columns and 6 rows (as shown in FIG. 6) or by 3 columns and 8 rows (as shown in FIG. 5), or other configurations are also possible. Other shapes (such as circular ones) are also possible.

As previously indicated, the LEDs 3 are controlled electronically, each one separately, and their power is adapted in a dynamic way to create a waving illumination effect: while some LEDs 3 are illuminated to their maximum, others are dimmed within the matrix of LEDs 3; each LED 3 illuminating a part of the logo area on the vertical tail plane 9, which allows the creation of a pattern on the surface.

The invention allows this dynamic illumination, not only in white light, but also in different colors, in order to have broader possibilities. This illumination effect can also be coupled with the application of a reflecting paint to highlight specific points or areas of the logo on the vertical tail plane 9 even more when illuminated.

The embedded electronic board 6 uses a microcontroller 16 which transmits the wanted illumination pattern to each LED 3. The definition of the pattern is made through a format that is easily customizable, using a matrix in a txt file defining the expected values of illumination of each LED 3 for different steps, that is then interpreted by the software of the microcontroller 16 and repeated in a loop.

This allows to provide a service to the airline companies, which can define the pattern that best suits them.

Figure 8:
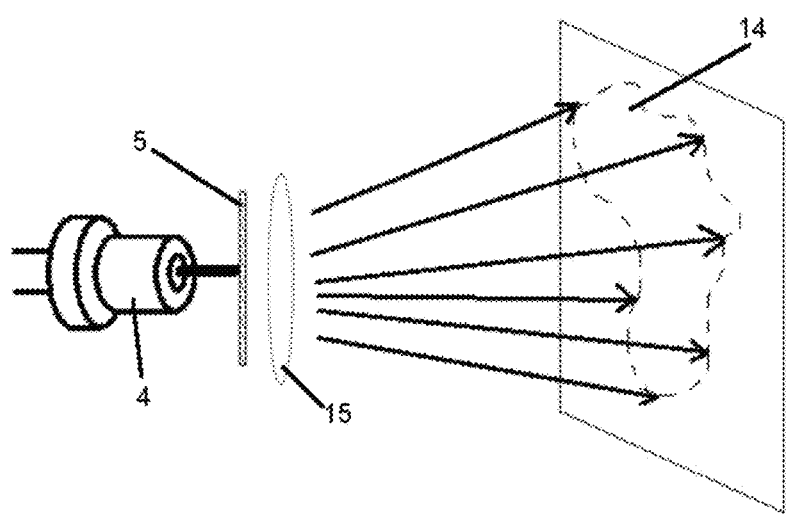
FIG. 8 shows the laser diode and a detail of the laser diode projection principle.

FIG. 8 shows the laser diode, the diffractive optical element 5, a focusing lens 15, and a detail of the laser diode projection principle.

It is also to be taken into account that lasers can be used instead of LEDs 3 in the illumination device 1 of the invention, thus having a matrix of lasers instead of a matrix of LEDs 3.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An illumination device for illuminating a vertical tail plane of an aircraft, comprising:
   a matrix of LEDs or lasers,
   a laser diode with a diffractive optical element,
   an electronic board with a microcontroller,
   a power supply unit, and
   a housing that encloses one or more of the matrix of LEDs, the laser diode, the electronic board and the power supply unit,
   wherein the LEDs or lasers and the laser diode are individually and electronically controlled by the microcontroller, such that the LEDs or lasers can be individually dimmed to create a dynamic illumination pattern on opposing side surfaces of the vertical tail plane, the illumination pattern being transmitted by the microcontroller, and the laser diode with the diffractive optical element is configured to create a fixed figure on the opposing side surfaces of the vertical tail plane, wherein the opposing side surfaces of the vertical tail plane comprise areas with reflecting paint to which the illumination device points.

2. The illumination device for illuminating the vertical tail plane of an aircraft, according to claim 1, wherein the LEDs or lasers are of different colors to create dynamic color illumination patterns.

3. The illumination device for illuminating the vertical tail plane of an aircraft, according to claim 1, wherein the housing comprises an upper cover made of plastic or glass.

4. The illumination device for illuminating the vertical tail plane of an aircraft, according to claim 1, wherein each LED or laser has an associated lens.

5. The illumination device for illuminating the vertical tail plane of an aircraft, according to claim 1, wherein each LED or laser has an associated mirror.

6. The illumination device for illuminating the vertical tail plane of an aircraft, according to claim 1, additionally comprising a heat sink under the electronic board to dissipate heat.

7. The illumination device for illuminating the vertical tail plane of an aircraft, according to claim 1, wherein the laser diode is monochromatic.

8. The illumination device for illuminating the vertical tail plane of an aircraft, according to claim 1, wherein the diffractive optical element is customizable and interchangeable throughout a life of the product.

9. The illumination device for illuminating the vertical tail plane of an aircraft, according to claim 1, wherein the power supply unit is enclosed by the housing.

10. The illumination device for illuminating the vertical tail plane of an aircraft, according to claim 1, wherein the power supply unit is not enclosed by the housing.

11. The illumination device for illuminating the vertical tail plane of an aircraft, according to claim 1, wherein the microcontroller is configured to cause each LED or laser to dim independently according to a predefined pattern sequenced in a loop.

12. An aircraft with exterior illumination on its vertical tail plane, comprising an aircraft fuselage, the vertical tail plane and two horizontal tail planes projecting from the aircraft fuselage, each horizontal tail plane comprising an illumination device according to claim 1 connected to an electrical supply system of the aircraft and oriented to provide light onto a respective closest side surface of the vertical tail plane, the vertical tail plane having a text or logo applied on it,
  wherein the side surfaces of the vertical tail plane comprise areas with a reflecting paint to which the illumination device on a horizontal tail plane points.

13. The aircraft with exterior illumination on its vertical tail plane, according to claim 12, wherein an illumination effect coupled with the reflecting paint highlights specific points or areas of the text or logo on the vertical tail plane more when illuminated.

14. The aircraft with exterior illumination on its vertical tail plane, according to claim 12, wherein the orientation of the illumination devices with respect to the vertical tail plane is adjustable.

15. The illumination device for illuminating the vertical tail plane of an aircraft, according to claim 1, wherein an illumination effect coupled with the reflecting paint highlights specific points or areas of the text or logo on the vertical tail plane more when illuminated.

* * * * *